(12) United States Patent
Baek et al.

(10) Patent No.: US 9,077,900 B2
(45) Date of Patent: Jul. 7, 2015

(54) DIGITAL IMAGE CAPTURING METHOD AND APPARATUS

(71) Applicant: Samsung Electronics Co., Ltd., Suwon-si, Gyeonggi-do (KR)

(72) Inventors: Jae-Myung Baek, Gyeonggi-do (KR); Dong-Youl Park, Suwon-si (KR); Woon-Tahk Sung, Seoul (KR); Soon-Kyoung Choi, Seoul (KR); Subash Pandey, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 84 days.

(21) Appl. No.: 13/628,813

(22) Filed: Sep. 27, 2012

(65) Prior Publication Data

US 2013/0083212 A1    Apr. 4, 2013

(30) Foreign Application Priority Data

Sep. 29, 2011    (KR) .......................... 10-2011-0099411

(51) Int. Cl.
*H04N 5/235* (2006.01)
*H04N 5/232* (2006.01)
*H04N 1/21* (2006.01)
*H04N 5/77* (2006.01)
*H04N 9/79* (2006.01)
*H04N 9/82* (2006.01)
*H04N 101/00* (2006.01)

(52) U.S. Cl.
CPC ........... *H04N 5/23245* (2013.01); *H04N 1/212* (2013.01); *H04N 5/772* (2013.01); *H04N 9/7921* (2013.01); *H04N 9/8227* (2013.01); *H04N 2101/00* (2013.01)

(58) Field of Classification Search
USPC ................................ 348/220.1, 221.1, 222.1
See application file for complete search history.

(56) References Cited

U.S. PATENT DOCUMENTS

| 2007/0188622 | A1* | 8/2007 | Yagi | 348/220.1 |
| 2007/0279498 | A1* | 12/2007 | Nonaka | 348/220.1 |
| 2009/0033783 | A1* | 2/2009 | Ota | 348/308 |

* cited by examiner

*Primary Examiner* — Yogesh Aggarwal
(74) *Attorney, Agent, or Firm* — The Farrell Law Firm, P.C.

(57) ABSTRACT

A method and an apparatus are provided for capturing a moving image and a still image. Moving-image capturing is ceased, when a still image-capturing request is generated. Still-image capturing operation parameters are set in the image sensor. The image sensor is exposed to generate still-image data. Moving-image capturing operation parameters are set in the image sensor, when generation of the still-image data is complete. The image sensor is exposed to generate the moving-image data. The still-image data is quality-processed and compressed to generate still-image frame data. Moving-image frame data generated by quality-processing and size-adjusting the moving-image data are connected and compressed to generate a moving-image stream. Quality-processed virtual moving-image frame data is generated using the still-image data. The quality-processed virtual moving-image frame data is inserted into a loss section of the moving-image stream corresponding to a period in which the moving-image capturing is ceased.

19 Claims, 7 Drawing Sheets

DIGITAL IMAGE CAPTURING METHOD AND APPARATUS

PRIORITY

This application claims priority under 35 U.S.C. §119(a) to a Korean Patent Application filed in the Korean Intellectual Property Office on Sep. 29, 2011 and assigned Ser. No. 10-2011-0099411, the entire disclosure of which is incorporated herein by reference.

BACKGROUND OF THE INVENTION

1. Field of the Invention

The present invention relates generally to image capturing methods, and more particularly, to a method and apparatus for capturing a still image while continuously capturing a moving image.

2. Description of the Related Art

A digital image capturing apparatus can provide both moving-still capturing and still-image capturing. A dual recording function has also been provided in which a still image is generated at the request of a user while capturing a moving image. The moving-image capturing is automatically continued.

Generally, in dual recording, the digital image capturing apparatus records a still image that has the same pixels as those in moving-image capturing.

To acquire a still image having a resolution that is higher than a moving image, an image sensor of the digital image capturing apparatus continuously outputs image data having full pixels or high pixels during moving-image capturing. An Image Signal Processor (ISP) having received the image data from the image sensor processes the quality of the image data to suitably reduce pixels of the image data for the moving-image capturing pixels, and outputs a moving-image frame data. Once the user presses a still-image capturing button during moving-image capturing, the ISP processes the quality of the image data to the full pixels or high pixels, thus outputting still-image data having the full pixels or high pixels.

If a moving-image processor and a still-image processor are provided in the ISP, a moving image and a still image can be processed at the same time. The image sensor is driven with the full pixels or high pixels at all times, such that in still-image capturing during moving-image capturing, mode change of the image sensor is not required and the screen stop or time loss phenomenon does not occur.

In conventional dual recording in which a high-resolution still image is captured, the image sensor is driven with the full pixels or high pixels during moving-image capturing and thus outputs the image data. The ISP receives and processes the image data, such that power consumption is larger than common moving-image capturing, which drives the image sensor with partial pixels.

In particular, as the number of pixels of the image sensor increases and a moving-image capturing frame rate increases, the image sensor and the ISP are required to operate at high speeds, power consumption increases, and quality degradation becomes worse due to heat generation. For this reason, a full-pixel operating frame rate does not reach a moving-image capturing frame rate.

To solve this problem, the image sensor may be driven with a small pixel number and a still-image pixel number may be increased through scaling up. However, a resulting substantial resolution increase effect is not satisfactory.

SUMMARY OF THE INVENTION

The present invention has been made to address at least the above problems and/or disadvantages and to provide at least the advantages described below. Accordingly, an aspect of the present invention provides a method and apparatus for capturing a still image, having a higher number of pixels than moving-image pixels, with low power in dual recording in which, during moving-image capturing, the still image is captured simultaneously according to a user's instruction.

According to an aspect of the present invention, a method is provided for capturing a moving image and a still image by a digital image capturing apparatus. Image sensor output of moving image data and moving-image capturing are ceased in a moving-image capturing mode, when a still image capturing request is generated during the moving-image capturing mode. Still-image capturing operation parameters are set in the image sensor to establish a still-image capturing mode. The image sensor is exposed for the still-image capturing to generate still-image data, when the still-image capturing mode is established. Moving-image capturing operation parameters are set in the image sensor to re-establish the moving-image capturing mode, when generation of the still-image data is complete. The image sensor is exposed for the moving-image capturing to generate the moving-image data and resume the moving-image capturing, when the moving-image capturing mode is established. The still-image data is quality-processed and compressed to generate still-image frame data corresponding to the still-image capturing. Moving-image frame data generated by quality-processing and size-adjusting the moving-image data are connected and compressed to generate a moving-image stream. Quality-processed virtual moving-image frame data is generated by using the still-image data, and the quality-processed virtual moving-image frame data is inserted into a loss section of the moving-image stream corresponding to a period in which the moving-image capturing is ceased for the still-image capturing.

According to another aspect of the present invention, a digital image capturing apparatus is provided that includes an image sensor and an ISP. The ISP ceases image sensor output of moving image data and moving-image capturing in a moving-image capturing mode when a still-image capturing request is generated during the moving-image capturing mode. The ISP sets still-image capturing operation parameters in the image sensor to establish a still-image capturing mode, and exposes the image sensor for the still-image capturing mode to generate still-image data when the still-image capturing mode is established. The ISP sets moving-image capturing operation parameters in the image sensor to re-establish a moving-image capturing mode when generation of the still-image data is complete, and exposes the image sensor for the moving-image capturing to generate the moving-image data and resume the moving-image capturing when the moving-image capturing mode is established. The ISP quality-processes and compresses the still-image data to generate still-image frame data corresponding to the still-image capturing, and connects and compresses moving-image frame data generated by quality-processing and size-adjusting the moving-image data to generate a moving-image stream. The ISP generates quality-processed virtual moving-image frame data by using the still-image data and inserts the quality-processed virtual moving-image frame data into a loss section of the moving-image stream corresponding to a period in which the moving-image capturing is ceased for the still-image capturing.

BRIEF DESCRIPTION OF THE DRAWINGS

The above and other aspects, features and advantages of the present invention will be more apparent from the following detailed description, when taken in conjunction with the accompanying drawings, in which.

DETAILED DESCRIPTION OF EMBODIMENTS OF THE PRESENT INVENTION

Figure 1:
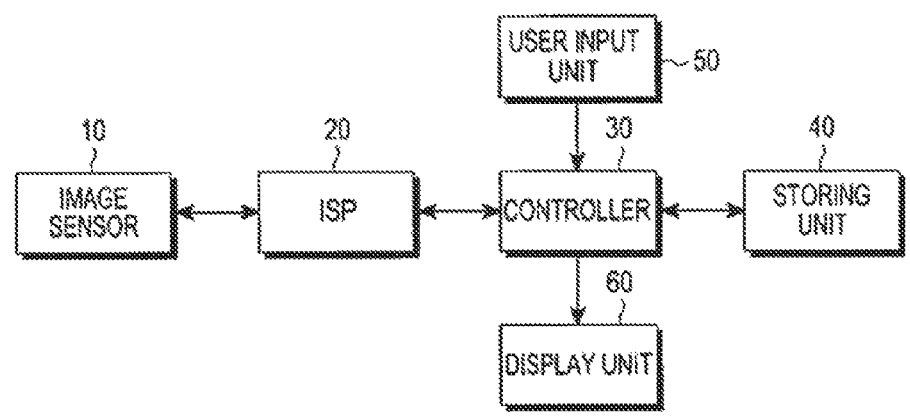
FIG. 1 is a block diagram illustrating a digital image capturing apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method and an apparatus for capturing a still image having a higher number of pixels than that of a moving-image, using low power in dual recording, in which the still image is captured during moving-image capturing, according to a user's instruction.

Accordingly, embodiments of the present invention set the operation parameters of an image sensor to the parameters for still-image capturing after completion of continuous moving-image data output, upon generation of a still-image capturing request during moving-image capturing, thereby changing an operation mode of the image sensor into a still-image capturing mode at high speed. Immediately after the image sensor is set to the still-image capturing mode, exposure for still-image capturing starts, thereby reducing the time for still-image capturing.

Upon completion of the still-image capturing, the operation parameters of the image sensor are set to the parameters for moving-image capturing to change the operation mode of the image sensor into the moving-image capturing mode at high speed. Immediately after the image sensor is set to the moving-image capturing mode, exposure for the moving-image capturing starts, thereby continuing the moving-image capturing. A quality-processed moving-image frame is generated using the captured still image and inserted into a period of a moving-image stream during still-image capturing.

Referring initially to FIG. 1, a block diagram illustrates a structure of a digital image capturing apparatus, according to an embodiment of the present invention. Referring to FIG. 1, the digital image capturing apparatus includes an image sensor 10, an ISP 20, a controller 30, a storing unit 40, a user input unit 50, and a display unit 60. The digital image capturing apparatus may be configured with an independent device or may be included in various portable terminals. For example, the digital image capturing apparatus may be included in a portable phone, a Personal Digital Assistant (PDA), a smart phone, a portable game console, or a portable music player.

The user input unit 50, which is a device for delivering a user input to the controller 30, may include various input means such as, for example, a plurality of keys and/or a touch screen. The user input unit 50 may be included in the display unit 60. A user selects an appropriate capturing mode or inputs a capturing request through the user input unit 50.

The storing unit 40 may include a Dynamic Random Access Memory (DRAM) unit, which is used as a working memory and a flash memory unit capable of keeping data in a power-off state. The DRAM unit stores various programs and data necessary for operation control and data processing of the digital image capturing apparatus. The flash memory unit stores compressed still-image data or a compressed moving-image stream.

The controller 30 controls the overall state and operation of the digital image capturing apparatus, and executes the driving of application programs of the digital image capturing apparatus and the operation control of the ISP 20. The controller 30 may be implemented with, for example, a microprocessor or a Digital Signal Processor (DSP). The controller 30 properly processes image data that is input to the ISP 20 to store it in the storing unit 40 or display it on the display unit 60. For example, once non-compressed still-image data in a YUV format is input, the controller 30 compresses the still-image data and stores it in the storing unit 40. If the compressed still-image data is input, the controller 30 may store it in the storing unit 40. Alternatively, if moving-image frame data in the YUV format is input, the controller 30 compresses the input moving-image frame data to generate a moving-image stream and stores it in the storing unit 40. If a compressed moving-image stream is input, it may be stored in the storing unit 40.

The ISP 20, under control of the controller 30, controls operations of the image sensor 10. The ISP 20 quality-processes image data acquired by the image sensor 10, and changes a format of the image data to output the same to the controller 30. For example, still-image data or moving-image data in an RAW format, generated by the image sensor 10, is quality-processed and size-adjusted, and then is changed into still-image frame data or moving-image frame data in a YUV format for output to the controller 30. Alternatively, the still-image frame data in the YUV format is changed into compressed still-image frame data for output to the controller 30, or the moving-image frame data in the YUV format is compressed to generate a moving-image stream for output to the controller 30. Such image data processing of the ISP 20 is determined according to the operation mode of the digital image capturing apparatus, or other setting values.

The image sensor 10, under control of the ISP 20, forms an image on an array of Complementary Metal Oxide Semiconductor (CMOS) transistors or Charge Coupled Device (CCD) memories, and electronically scans an output of each cell (a circuit element as a minimum unit) to convert the image into an electric signal, thus outputting image data to the ISP 20.

While in the foregoing embodiment of the present invention, the ISP 20 and the controller 30 are separate independent components, in another embodiment of the present invention, the ISP 20 may be included in the controller 30 to form a single image processing module. The digital image capturing apparatus structured as described above, when performing dual recording according to an embodiment of the present invention, drives the image sensor 10 according to a partial-pixel driving scheme during moving-image capturing, and drives the image sensor 10 according to a full-pixel driving scheme during still-image capturing. Specifically, the digital image capturing apparatus sets the operation mode of the image sensor 10 to a moving-image capturing mode during moving-image capturing, and upon generation of a still-image capturing event, changes the operation mode of the image sensor 10 to the still-image capturing mode to generate a still image. Upon completion of still-image capturing, the digital image capturing apparatus changes the operation mode of the image sensor 10 to the moving-image capturing mode to continue moving-image capturing.

Figure 2:
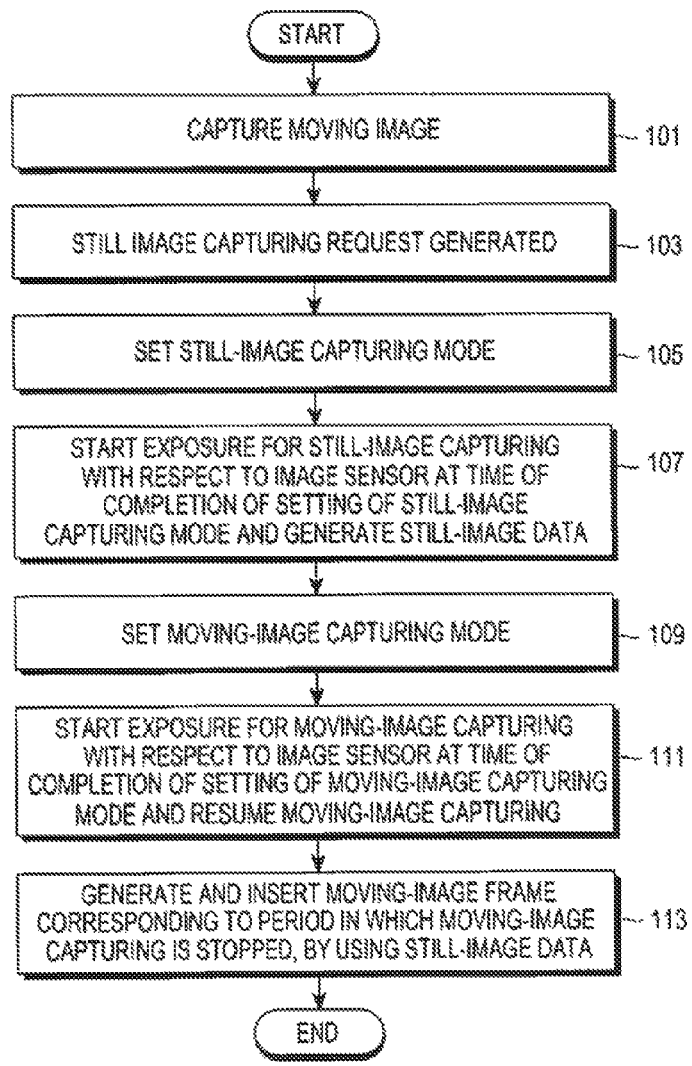
FIG. 2 is a flowchart illustrating operations of a digital image capturing apparatus, according to an embodiment of the present invention.

Referring now to FIG. 2, a flowchart illustrates an operating process of the digital image capturing apparatus, according to an embodiment of the present invention. In FIG. 2, it is assumed that the digital image capturing apparatus, upon generation of a still-image capturing request during moving-image capturing, is set to a dual recording mode in which recording of a moving-image frame based on moving-image capturing and recording of a still image based on still-image capturing can be performed at the same time. It is also assumed that during moving-image capturing, the image sensor 10 is driven according to the partial-pixel driving scheme, such as a sub-sampling scheme or a crop scheme, and the image sensor 10 is driven according to the full-pixel driving scheme during still-image capturing in the course of the moving-image capturing.

Referring to FIG. 2, in step 101, the digital image capturing apparatus performs moving image capturing in the dual recording mode. Specifically, the operation mode of the image sensor 10 is a moving-image mode. Thus, the image sensor 10 is being driven according to the partial-pixel driving scheme.

The partial-pixel driving scheme of the image sensor 10 generates image data by using sensor values corresponding to partial pixels among full pixels of the image sensor 10 as effective values. For example, the partial-pixel driving scheme may be a sub-sampling scheme or a crop scheme. The sub-sampling scheme is shown in FIG. 3 and the crop scheme is shown in FIG. 4.

Figure 3:
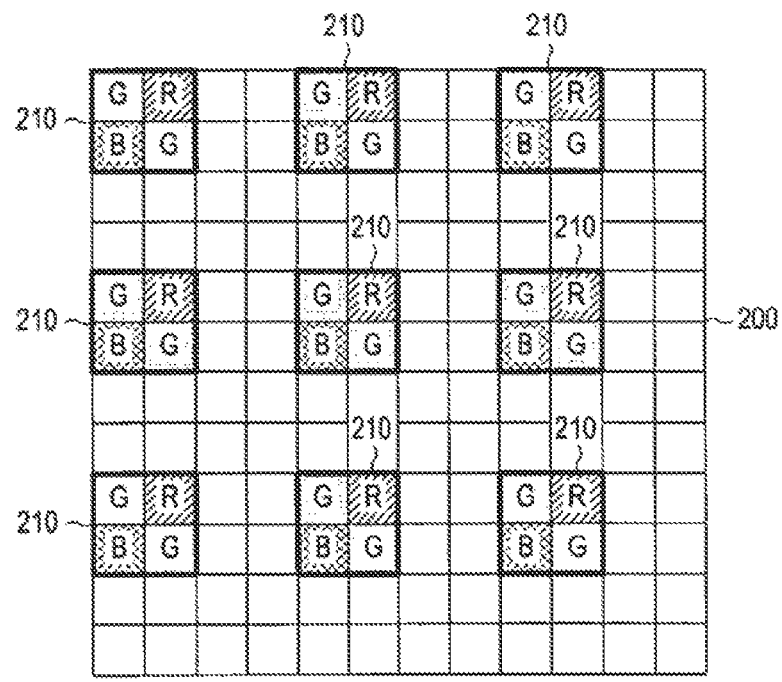
FIG. 3 is a diagram illustrating a partial-pixel operating scheme of a sub-sampling scheme of an image sensor during common moving-image capturing.

Referring to FIG. 3, the sub-sampling scheme generates moving-image frame data by using sensor values of partial pixels at predetermined positions among full pixels 200 of the image sensor 10, as effective values.

Figure 4:
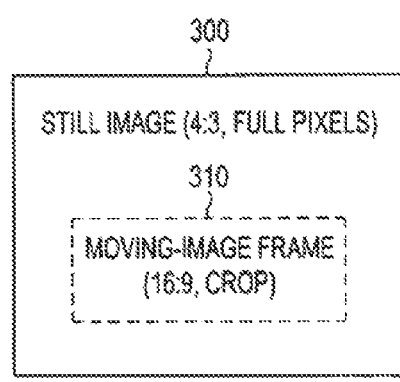
FIG. 4 is a diagram illustrating a partial-pixel operating scheme of a crop scheme of an image sensor during common moving-image capturing.

Referring to FIG. 4, the crop scheme crops a partial region 310 as a moving-image region from full pixels 300 of the image sensor 10 to generate moving-image data by using sensor values of pixels included in the partial region 310 as effective values.

During still-image capturing, the sensor values of the full pixels 200 or 300 may be used as effective values.

Referring back to FIG. 2, when the user wants to capture a still image during moving-image capturing, the user inputs a still image shutter key through the user input unit 50 to request still-image capturing. Thus, the controller 30 senses generation of the still-image capturing event, in step 103. In step 105, the controller controls the ISP 20 to set the operation mode of the image sensor 10 to the still-image capturing mode. When the output of the moving-image data, which is being output at the time of generation of the still-image capturing event in the image sensor 10, is completed, the ISP 20 resets the image sensor 10 or changes the operation mode of the image sensor 10 to a standby mode.

Once the image sensor 10 is reset, the output of the moving-image data is stopped at the time of an attempt of reset. Consequently, it is desirable to attempt the reset of the image sensor 10 after completion of the output of the moving-image data, which is being output at the time of generation of the still-image capturing event in the image sensor 10. Once the image sensor 10 is reset, operation parameter values set in the image sensor 10 are also reset, such that all operation parameters have to be newly set.

The mode change of the image sensor 10 into the standby mode is made after the output of the moving-image, which is being output at the time of an attempt of the mode change in the image sensor 10, is completed. The operation parameter values of the image sensor 10 maintain previously set values, such that only parameters, which need to be changed, are set. The ISP 20 sets the operation parameters for still-image capturing in the image sensor 10 to set the still-image capturing mode. The operation parameters for still-image capturing are values that determine, for example, size, exposure time, gain, and/or frame rate, of a still image generated by actual capturing. To generate a high-definition still image, the size of the still image, i.e., effective pixels of the image sensor 10, may be set to full pixels. Alternatively, the effective pixels may be set for a resolution designated by the user. Alternatively, the effective pixels of the image sensor 10 may be set to generate a still image of higher quality than a moving image. In the following embodiment, it is assumed that the effective pixels of the image sensor 10 are set to full pixels in still-image capturing.

In step 107, the ISP 20 begins exposure for still-image capturing with respect to the image sensor 10 at the time of completion of setting of the still-image capturing mode, and quality-processes the still-image data output from the image sensor 10.

Figure 5:
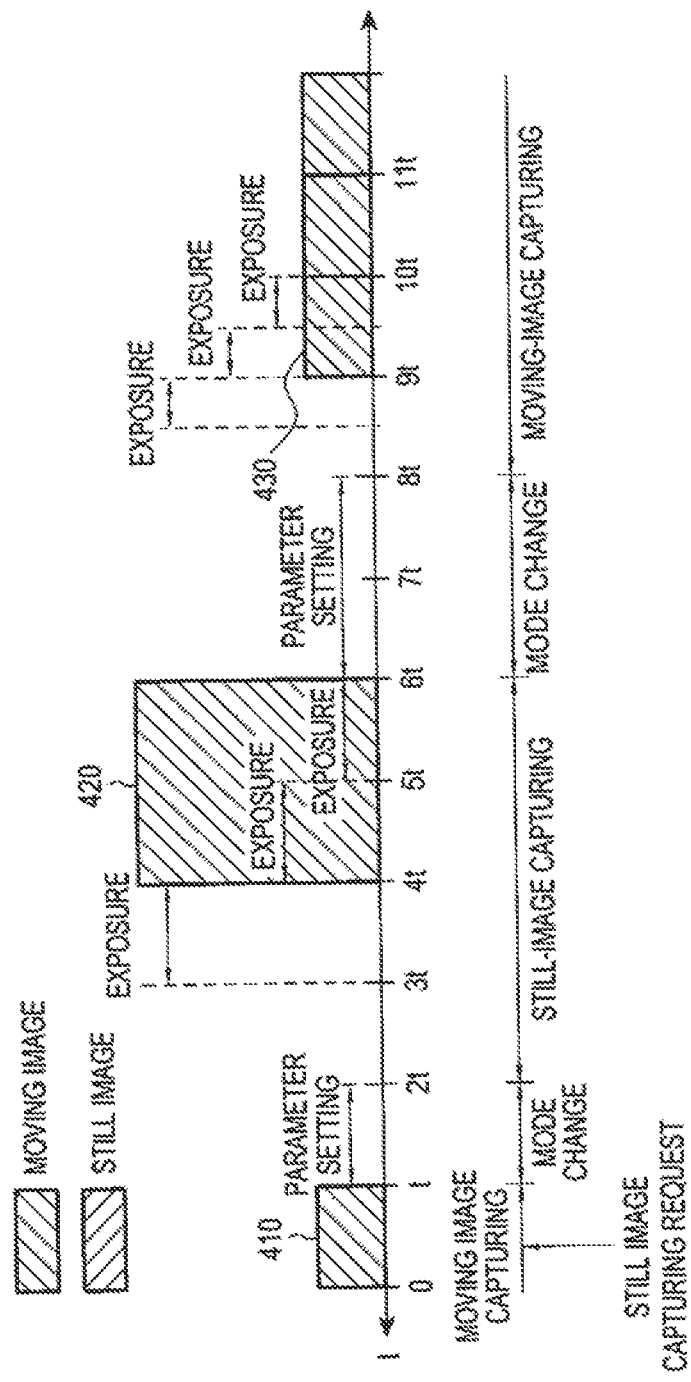
FIG. 5 is a diagram illustrating a dual recording process based on a general mode change of an image sensor, according to an embodiment of the present invention.
Figure 6:
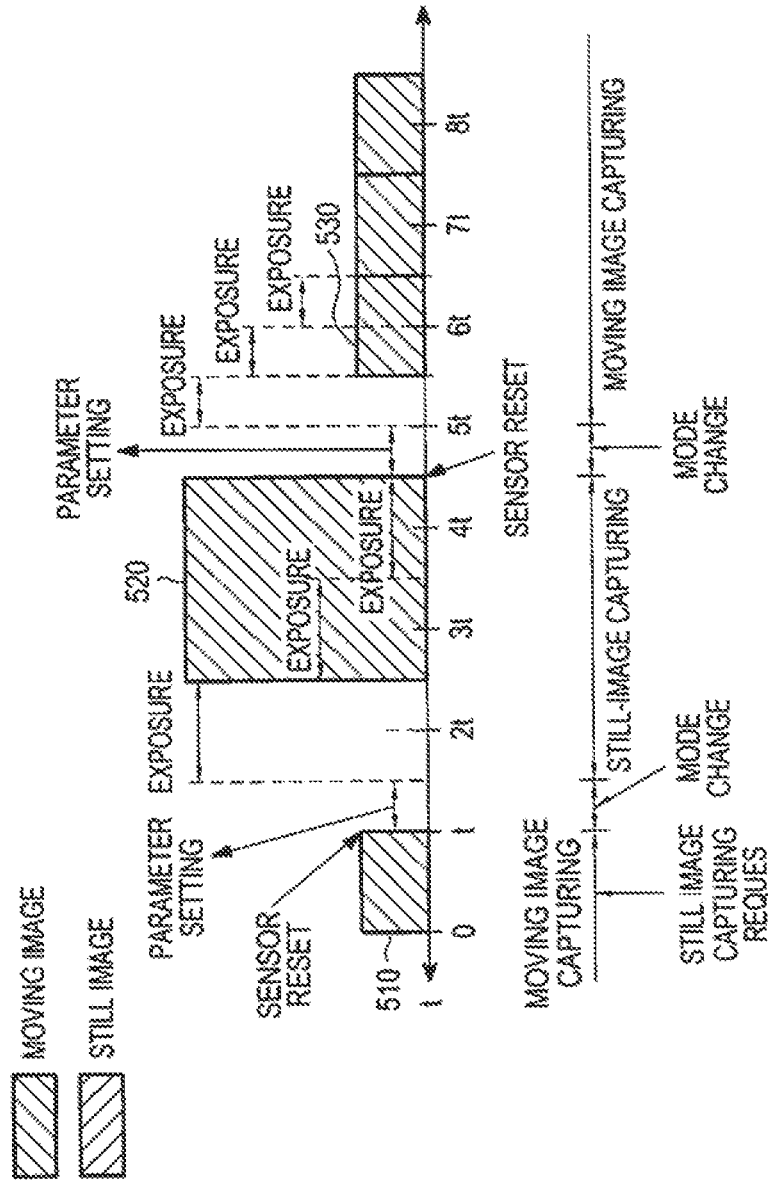
FIG. 6 is a diagram illustrating a dual recording process based on high-speed mode change of an image sensor, according to an embodiment of the present invention.

The aforementioned still-image capturing mode setting process and still-image capturing process are described in greater detail below with reference to FIGS. 5 and 6. FIG. 5 is a diagram illustrating a dual recording process based on general mode change of the image sensor 10, according to an embodiment of the present invention. FIG. 6 is a diagram illustrating a dual recording process based on a high-speed mode change of the image sensor 10, according to an embodiment of the present invention. Generally, moving-image generation requires 30 frames-per-second (fps) and still-image generation requires 15 fps. Therefore, it is assumed that a time required for generation of a single moving image is t, and a time required for generation of a single still image is 2t. A period in which data is actually output and an empty period in which no data is output both exist in the time T, however to facilitate understanding, the empty period is not shown.

The operation mode of the image sensor 10 may be changed according to a general scheme, as shown in FIG. 5. Referring to FIG. 5, upon generation of a still-image capturing request during moving-image capturing (a period of 0 to t), the operation of the image sensor 10 is maintained until output of moving-image data 410 is complete. Upon completion of the output of the moving-image data 410, the parameters for still-image capturing are set in the image sensor 10 in a period of t to 2t. The ISP 20 starts exposure for still-image capturing with respect to the image sensor 10, after an elapse of a time resulting from subtraction of an exposure time (assumed to be t) from a period (2t) of a still image to complete the output of the still-image data 420 (a period of 3t to 6t). As such, conventionally, the operation mode of the image sensor 10 is changed and still-image capturing is completed at 6t regardless of the exposure time (0-2t).

However, in the high-speed mode change of the embodiments of the present invention, as shown in FIG. 6, the operation parameters are set after the image sensor 10 is reset or mode-changed into the standby mode. Exposure for still-image capturing starts with respect to the image sensor 10 at the time an operation of parameter setting is complete, thereby reducing a time for mode change and still-image capturing.

Referring to FIG. 6, if the still-image capturing request is generated during moving-image capturing (the period of 0 to t), the operation of the image sensor 10 is maintained until output of moving-image data 510 is complete. Upon completion of the output of the moving-image data 510, the image sensor 10 is reset or mode-changed into the standby mode, after which the operation parameters for still-image capturing are set in the image sensor 10. Since the image sensor 10 is reset or in the standby mode, a time for operation parameter setting is reduced when compared to the case of FIG. 5.

Upon completion of operation parameter setting for still-image capturing, i.e., upon completion of still-image capturing mode setting in the image sensor 10, exposure for still-image capturing with respect to the image sensor 10 begins without any wait from the completion time point. Therefore, a time until completion of still-image capturing is shortened, according to an embodiment of the present invention.

Referring back to FIG. 2, upon completion of still-image capturing within a short time, the ISP 20 sets the moving-image capturing mode in the image sensor 10 in step 109. The setting of the moving-image capturing mode is performed in a manner similar to that of setting the still-image capturing mode. Specifically, the ISP 20 resets the image sensor 10 or mode-changes the image sensor 10 into the standby mode if the image sensor 10 completes output of the still-image data. The ISP 20 sets the operation parameters for moving-image capturing in the image sensor 10 to set the moving-image capturing mode. The operation parameters for moving-image capturing are values that determine, for example, size, exposure time, gain, and/or frame rate of a moving image generated by actual capturing. Thus, the effective pixels of the image sensor 10 may be set to the partial pixels as shown in FIG. 3 or 4.

The ISP 20 then starts exposure for moving-image capturing, with respect to the image sensor 10, from the completion time point of moving-image capturing mode setting, thus resuming moving-image capturing, in step 111.

Referring again to FIG. 6, once the image sensor 10 completes the output of still-image data 520, the ISP 20 resets the image sensor 10 or mode-changes the image sensor 10 into the standby mode, and sets the operation parameters for moving-image capturing, such that a time for mode change is shorter than 1t. In addition, since the ISP 20 starts exposure for moving-image capturing without any wait from an operation parameter setting completion time point (5t), the output of first moving-image data 530 from resuming of moving-image capturing is completed. Specifically, a time until completion of the output of the first moving-image data 530 from resuming of moving-image capturing can be reduced.

On the other hand, in the general mode change shown in FIG. 5, exposure for moving-image capturing also starts after an elapse of a predetermined time from a mode change completion time point (8t), such that a time of 3t is required to complete the output of first moving-image data 430 after resuming moving-image capturing. As a result, in the high-speed mode change, according to an embodiment of the present invention, a time for setting the moving-image capturing mode in the image sensor 10 and actually resuming moving-image capturing is shortened when compared to in the general mode change.

Referring back to FIG. 2, the ISP 20, under control of the controller 30, generates a moving-image frame while moving-image capturing is paused by using the still-image data generated in step 107, and inserts the moving-image frame into a moving-image stream, in step 113. Specifically, during generation of the still-image data, generation of the moving-image frame data is paused. Consequently, a moving-image frame is absent in a particular section of the moving-image stream. Therefore, the ISP 20 and the controller 30 cooperate to generate the moving-image frame to be inserted into the moving-image stream, by using the still-image data.

Figure 7:
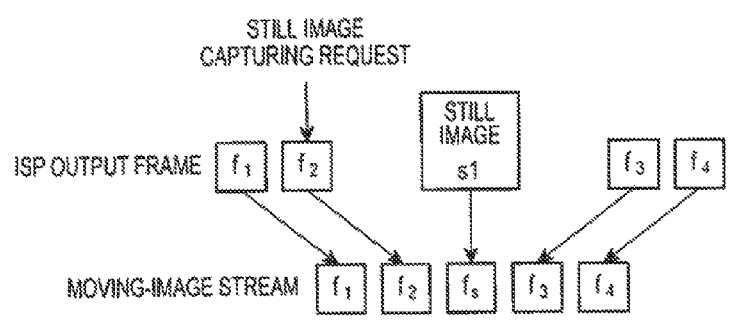
FIG. 7 is a diagram illustrating a supplemental process for moving-image frame data, according to an embodiment of the present invention.

FIG. 7 is a diagram illustrating a supplement process of moving-image frame data, according to an embodiment of the present invention.

Referring to FIG. 7, the ISP 20 quality-processes and size-adjusts data received from the image sensor 10 to output moving-image frame data f1 and moving-image frame data f2 during moving-image capturing, in step 101 of FIG. 2. The ISP 20 outputs still-image frame data s1, based on the still-image capturing in step 107 of FIG. 2, and outputs moving-image frame data f3 and moving-image frame data f4, based on the moving-image capturing in step 111 of FIG. 2.

The moving-image stream, which is composed of moving-image frame data, includes the moving-image frame data f1, the moving-image frame data f2, the moving-image frame data f3, and the moving-image frame data f4. However, due to the still-image capturing, there is no moving-image frame between the moving-image frame data f2 and the moving-image frame data f3.

For this reason, the controller 30 extracts data of the same view angle and the same pixels as moving-image frame data from still-image frame data. Virtual moving-image frame data fs is thereby generated and inserted between the moving-image frame data f2 and the moving-image frame data f3.

If a still-image frame rate is ½ of a moving-image frame rate, virtual moving-image frame data extracted from still-image data may be inserted into a moving-image stream twice.

If a time loss of moving-image capturing before and after still-image capturing is more than a reference time interval due to a mode change, a plurality of virtual moving-image frame data may be inserted into a moving-image stream to minimize the time loss. The reference time interval may be, for example, a time corresponding to at least one virtual moving-image frame data. Alternatively, the last moving-image frame data before generation of still-image data and the first moving-image frame data after generation of the still-image data, for example, the moving-image frame data f2 and the moving-image frame data f3 in FIG. 7, may also be inserted into the loss section of the moving-image stream.

Additional moving-image frame data may be generated based on an object's movement between the virtual moving-image frame data and its proceeding and following moving-image frame data, i.e., the moving-image frame data f2 and the moving-image frame data f3, and may be inserted into the loss section. Specifically, a motion vector between the moving-image frame data f2 and the virtual moving-image frame data fs is calculated, and an object's position on the moving-image frame data is determined based on the calculated motion vector, after which first additional moving-image frame data is generated based on the object's position. A motion vector between the virtual moving-image frame data fs and the moving-image frame data f3 is also calculated, and the object's position on the moving-image frame data is determined based on the calculated motion vector, after which second additional moving-image frame data is generated based on the object's position.

The first additional moving-image frame data and the second additional moving-image frame data are inserted before and after the virtual moving-image frame data fs.

In the foregoing embodiment of the present invention, the ISP 20 starts exposure for moving-image capturing with respect to the image sensor 10 from the completion time point of moving-image capturing mode setting (step 111 of FIG. 2). However, according to another embodiment of the present invention, the ISP 20 may be configured to start exposure for moving-image capturing after waiting a time that is greater than that required for inserting the virtual moving-image frame data into the moving-image stream, upon completion of moving-image capturing mode resetting after the output of the still-image data.

Figure 8:
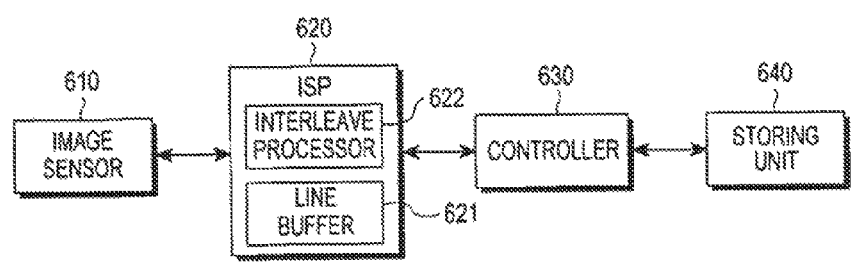
FIGS. 8 and 9 illustrate block diagrams of a digital image capturing apparatus, according to another embodiment of the present invention.
Figure 9:
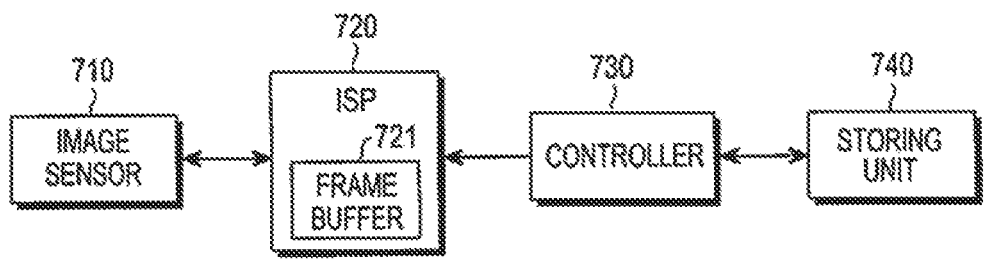

Specifically, in response to a request generated during moving-image capturing, the image sensor 10 is mode-changed at high speed to output still-image data. Thereafter, the image sensor 10 is reset to the moving-image capturing mode. Upon completion of setting the moving-image capturing mode, instead of starting exposure for moving-image capturing without any wait, the virtual moving-image frame data generated using the still-image data is inserted into the moving-image stream, and then the exposure for moving-image capturing starts. Such generation of the virtual moving-image frame data may be performed in various ways according to operation characteristics of the ISP 20, as illustrated in FIGS. 8 and 9. Operations and roles of image sensors 610 and 710, ISPs 620 and 720, controllers 630 and 730, and storing units 640 and 740 of a digital image capturing apparatus shown in FIGS. 8 and 9 are similar to those described above. However, in generation of the virtual moving-image frame data, they have characteristics described below.

FIG. 8 shows a digital image capturing apparatus when the ISP 620 includes a line buffer 621. Generally, the ISP 620 having the line buffer 621 quality-processes data input from the image sensor 610 and outputs it to the controller 630 within a short time (~1 ms), such that there is no time delay between the input and output of the ISP 620. The ISP 620 may include an interleave processor 622 which performs quality processing, compression, and size adjustment with respect to still-image data input from the image sensor 610 in the still-image capturing mode. The interleave processor 622 combines compressed full-pixel still-image data and non-compressed partial-pixel data in a single interleave frame and delivers the single interleave frame to the controller 630. In FIG. 8, the ISP 620, including the interleave processor 622, quality-processes and simultaneously compresses the still-image data input from the image sensor 610 in the still-image capturing mode, by using a small-size internal line buffer memory. The ISP 620, while quality-processing the still-image data, reduces the still-image data to have the same view angle and pixels as the moving-image frame data, thereby generating virtual moving-image frame data for use as the non-compressed partial-pixel data. Generally, a format of non-compressed virtual moving-image frame data is a YUV format, and a format of compressed still-image data is a Joint Photographic Experts Group (JPEG) format.

The controller 630 separates the virtual moving-image frame data from the interleave frame, and inserts the virtual moving-image frame data into a proper position of the moving-image stream. The controller 630 then separates the compressed still-image data to store it in the storing unit 640.

FIG. 9 shows a digital image capturing apparatus when the ISP 720 includes a frame buffer 721. Generally, the ISP 720 having the frame buffer 721 stores the image data input from the image sensor 710 in the frame buffer 721 to improve the quality of quality processing, and then performs quality processing later. As a result, a time delay of one or two frames exists between an output of the image sensor 710 and an output of the ISP 720.

In this case, the ISP 720, upon receiving the still-image capturing request during moving-image capturing, quality-processes moving-image frame data, which is being output from the image sensor 710 at that time, and outputs the quality-processed moving-image frame data. The image sensor 710 completes the on-going moving-image data output, and is quickly mode-changed into the still-image capturing mode to output the still-image data of full pixels or high pixels.

The ISP 720 quality-processes the moving-image data input from the image sensor 710 to change it into moving-image frame data A, and outputs the moving-image frame data A to the controller 730. The still-mage data input from the image sensor 710 is stored in the frame buffer 721 and at the same time, is pixel-reduced and quality-processed to generate and output virtual moving-image frame data to the controller 730.

The image sensor 710 is quickly mode-changed into the moving-image capturing mode upon completion of still-image output, to resume the output of the moving-image data, such that the ISP 720 outputs moving-image frame data B to the controller 730.

The controller 730 inserts virtual moving-image frame data between the moving-image frame data A and the moving-image frame data B of the moving-image stream. At this time, a plurality of identical virtual moving-image frame data may be inserted, or virtual moving-image frame data may be additionally generated and inserted, referring to the moving-image frame data A and the moving-image frame data B.

Upon completion of moving-image capturing, the ISP 720 quality-processes and when necessary, compresses the still-image data stored in the frame buffer 721 to output the data to the controller 730. The controller 730 stores the input still-image data in the storing unit 740.

When the ISP 720 having the frame buffer 721 can output the compressed still-image data and the non-compressed moving-image frame data in a single frame in the foregoing interleave manner, the controller 730 may extract the moving-image frame data from the interleave frame and insert the extracted moving-image frame data into the moving-image stream.

As is apparent from the foregoing description, according to embodiments of the present invention, in dual recording in which a still image is captured according to a user's instruction during moving-image capturing, capturing of the still image having a higher number of pixels than the moving-image can be realized with low power.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for capturing a moving image and a still image by a digital image capturing apparatus, the method comprising the steps of:

setting still-image capturing operation parameters in an image sensor to establish a still-image capturing mode, when a still image-capturing request is generated during a moving-image capturing mode;

exposing the image sensor according to a full-pixel scheme for the still-image capturing to generate still-image data when the still-image capturing mode is established;

setting moving-image capturing operation parameters in the image sensor to re-establish the moving-image capturing mode, when generation of the still-image data is complete;

exposing the image sensor according to a partial-pixel scheme for the moving-image capturing to generate the moving-image data and resume the moving-image capturing, when the moving-image capturing mode is established, wherein the partial-pixel scheme uses a sub-sampling scheme that includes using image sensor values of partial pixels at predetermined positions among full pixels of the image sensor;

generating still-image frame data corresponding to the still-image capturing and a moving-image stream corresponding to adjusting the moving-image data;

generating virtual moving-image frame data having a same view angle and a same number of pixels as the moving-image frame data by using the still-image frame data; and inserting the virtual moving-image frame data into a loss section of the moving-image stream corresponding to a period in which the moving-image capturing is ceased for the still-image capturing when the loss section is longer than a time corresponding to the virtual moving-image frame data.

2. The method of claim 1, wherein establishing the still-image capturing mode comprises:

resetting the image sensor or switching the image sensor into a standby mode, when the output of the moving-image data from the image sensor is complete; and setting the still-image capturing operation parameters in the image sensor, wherein exposure of the image sensor for the still-image capturing begins immediately upon completion of the setting of the still-image capturing operation parameters.

3. The method of claim 1, wherein re-establishing the moving-image capturing mode comprises:

resetting the image sensor or switching the image sensor into a standby mode, when the generation of the still-image data is complete; and setting the moving-image capturing operation parameters in the image sensor.

4. The method of claim 3, wherein exposure according to a partial-pixel scheme of the image sensor for the moving-image capturing begins immediately upon completion of the setting of the moving-image capturing operation parameters.

5. The method of claim 3, wherein exposure according to a partial-pixel scheme of the image sensor for the moving-image capturing begins after a time greater than that required for inserting the virtual moving-image frame data into the moving-image stream, when the setting of the moving-image capturing operation parameters is completed.

6. The method of claim 1, wherein inserting the virtual moving-image frame data into the loss section of the moving-image stream comprises inserting a plurality of the virtual moving-image frame data into the loss section, when the loss section is longer than a time corresponding to the virtual moving-image frame data.

7. The method of claim 1, wherein inserting the virtual moving-image frame data into the loss section of the moving-image stream comprises inserting a plurality of the virtual moving-image frame data into the loss section, when a frame rate of the still-image data is less than ½ of a frame rate of the moving-image data.

8. The method of claim 1, wherein inserting the virtual moving-image frame data into the loss section of the moving-image stream comprises:

generating first additional moving-image frame data based on a motion vector detected between first moving-image frame data generated last prior to the generation of the still-image data and the virtual moving-image frame data, when the loss section is longer than a time corresponding to the virtual moving-image frame data;

generating second additional moving-image frame data based on a motion vector detected between second moving-image frame data generated first after the generation of the still-image data and the virtual moving-image frame data; and sequentially inserting the first additional moving-image frame data, the virtual moving-image frame data, and the second additional moving-image frame data into the loss section.

9. The method of claim 1, wherein inserting the virtual moving-image frame data into the loss section of the moving-image stream comprises sequentially inserting first moving-image frame data generated last prior to the generation of the still-image data, the virtual moving-image frame data, and second moving-image frame data generated first after the generation of the still-image data into the loss section, when the loss section is longer than a time corresponding to the virtual moving-image frame data.

10. The method of claim 1, wherein inserting the virtual moving-image frame data into the loss section of the moving-image stream comprises:

generating, by an Image Signal Processor (ISP), an interleave frame by combining the still-image frame data and the virtual moving-image frame data, and outputting the interleave frame to a controller; and decomposing, by the controller, the interleave frame to insert the virtual moving-image frame data into the moving-image stream and to store the still-image frame data in a storing unit.

11. The method of claim 1, wherein inserting the virtual moving-image frame data into the loss section of the moving-image stream comprises storing, by an ISP, the still-image data in an internal frame buffer of the ISP and outputting the virtual moving-image frame data to insert the virtual moving-image frame data into the moving-image stream, wherein the ISP processes the still-image data stored in the frame buffer and outputs the still-image frame data, when the moving-image capturing is complete.

12. The method of claim 1, wherein inserting the virtual moving-image frame data into the loss section of the moving-image stream comprises storing, by an ISP, the still-image data in a storing unit, and inserting, by a controller, the virtual moving-image frame data into the moving-image stream, wherein the ISP quality-processes and compresses the still-image data stored in the storing unit to generate the still-image frame data and stores the still-image frame data in the storing unit, when the moving-image capturing is complete.

13. A digital image capturing apparatus comprising:

an image sensor; and an Image Signal Processor (ISP) for setting still-image capturing operation parameters in the image sensor to establish a still-image capturing mode when a still-image capturing request is generated during the moving-image capturing mode, exposing the image sensor according to a full-pixel scheme for the still-image capturing mode to generate still-image data when the still-image capturing mode is established, setting moving-image capturing operation parameters in the image sensor to re-establish a moving-image capturing mode when generation of the still-image data is complete, exposing the image sensor according to a partial-pixel scheme for the moving-image capturing to generate the moving-image data and resume the moving-image capturing when the moving-image capturing mode is established, wherein the partial-pixel scheme uses a sub-sampling scheme that includes using image sensor values of partial pixels at predetermined positions among full pixels of the image sensor, generating still-image frame data corresponding to the still-image capturing and a moving-image stream corresponding to adjusting the moving-image data, and generating virtual moving-image frame data having a same view angle and a same number of pixels as the moving-image frame data by using the still-image frame data and inserting the virtual moving-image frame data into a loss section of the moving-image stream corresponding to a period in which the moving-image capturing is ceased for the still-image capturing when the loss section is longer than a time corresponding to the virtual moving-image frame data.

14. The digital image capturing apparatus of claim 13, wherein the ISP, for establishing the still-image capturing mode, resets the image sensor or switches the image sensor into a standby mode when the output of the moving-image data from the image sensor is complete, sets the still-image capturing operation parameters in the image sensor, and immediately begins exposure of the image sensor for the still-image capturing upon completion of the setting of the still-image capturing operation parameters.

15. The digital image capturing apparatus of claim 13, wherein the ISP, for re-establishing the moving-image capturing mode, resets the image sensor or switches the image sensor into a standby mode when the generation of the still-image data is complete, and sets the moving-image capturing operation parameters in the image sensor.

16. The digital image capturing apparatus of claim 13, wherein the ISP immediately begins exposure according to a partial-pixel scheme of the image sensor for the moving-image capturing upon completion of the setting of the moving-image capturing operation parameters.

17. The digital image capturing apparatus of claim 15, wherein the ISP begins exposure according to a partial-pixel scheme of the image sensor for the moving-image capturing after a time greater than that required for inserting the virtual moving-image frame data into the moving-image stream, when the setting of the moving-image capturing operation parameters is completed.

18. The digital image capturing apparatus of claim 13, wherein the ISP generates an interleave frame by combining the still-image frame data and the virtual moving-image frame data and outputs the interleave frame to a controller, and the controller decomposes the interleave frame to insert the virtual moving-image frame data into the moving-image stream and to store the still-image frame data in a storing unit.

19. The digital image capturing apparatus of claim 13, wherein the ISP stores the still-image data in an internal frame buffer of the ISP and outputs the virtual moving-image frame data, and processes the still-image data stored in the frame buffer and outputs the still-image frame data upon completion of the moving-image capturing, and the controller inserts the virtual moving-image frame data into the moving-image stream.

* * * * *